United States Patent [19]

Skodell et al.

[11] Patent Number: 5,556,450

[45] Date of Patent: Sep. 17, 1996

[54] NEUTRAL SELF-SHINE EMULSION FOR THE CARE OF FLOORS (III)

[75] Inventors: Birgit Skodell; Rainer Osberghaus, both of Duesseldorf; Karl-Heinz Rogmann, Ratingen; Heiko Faubel, Wermelskirchen; Harald Bossek, Duesseldorf, all of Germany

[73] Assignee: Henkel Kommanditgesellschaft auf Aktien, Duesseldorf, Germany

[21] Appl. No.: 464,664

[22] PCT Filed: Dec. 10, 1993

[86] PCT No.: PCT/EP93/03487

§ 371 Date: Jun. 21, 1995

§ 102(e) Date: Jun. 21, 1995

[87] PCT Pub. No.: WO94/14909

PCT Pub. Date: Jul. 7, 1994

[30] Foreign Application Priority Data

Dec. 22, 1992 [DE] Germany .......................... 42 43 472.6

[51] Int. Cl.$^6$ ...................... C09D 191/06; C09D 191/08
[52] U.S. Cl. .............................................. 106/10; 106/271
[58] Field of Search ........................................ 106/10, 271

[56] References Cited

U.S. PATENT DOCUMENTS 4,460,734  7/1984  Owens et al. ............................ 524/376

FOREIGN PATENT DOCUMENTS 0041834  12/1981  European Pat. Off. .
0449038  10/1991  European Pat. Off. .

*Primary Examiner*—David Brunsman
*Attorney, Agent, or Firm*—Ernest G. Szoke; Wayne C. Jaeschke; Real J. Grandmaison

[57] ABSTRACT

An aqueous floor-care, self-shine emulsion composition having a pH of 5 to 9 containing a natural or synthetic wax and an alcohol selected from benzyl alcohol, 2-phenylethanol, 2-phenoxyethanol and mixtures thereof.

6 Claims, No Drawings

NEUTRAL SELF-SHINE EMULSION FOR
THE CARE OF FLOORS (III)

This application is a 371 of PCT/EP93/03487 filed Apr. 10, 1993.

BACKGROUND OF THE INVENTION

1. Field of the Invention

This invention relates to a floor-care formulation in the form of a dispersion which dries leaving a shine on the floor. Formulations such as these are also known as self-shine emulsions.

2. Discussion of Related Art

Nowadays, new previously untreated floors and floors which have been subjected to thorough cleaning are mainly treated with self-shine emulsions to protect them against soiling and damage. These emulsions, which contain wax and/or film-forming polymers in varying amounts, form continuous, glossy and soil-repellent films on the floors after drying. Films with a high percentage wax content can easily be polished and, when necessary, are also easy to remove from the surfaces whereas films consisting predominantly or completely of film-forming polymers are particularly resistant to mechanical stressing. A problem affecting all self-shine emulsions, which has not yet been completely solved, is that the emulsions or dispersions have to dry extremely uniformly on the surfaces if a completely continuous protective film is to be formed. It is very often found that the initially continuous film of the aqueous dispersion breaks up on drying and, in some cases, even contracts to form individual droplets so that the floor-care film formed is patchy in appearance. This effect is particularly noticeable in the case of the dispersions with a substantially neutral pH value which are preferred today. One of the problems addressed by the present invention was to provide an improvement in this regard. Another problem addressed by the invention was to improve the stability of the dispersions, above all during storage at low temperatures.

Description of the Invention

The present invention relates to an aqueous self-shine emulsion for the care of floors which, in undiluted form, has a pH value of 5 to 9 and which contains a natural or synthetic wax and an alcohol from the group consisting of benzyl alcohol, 2-phenyl ethanol, 2-phenoxy-ethanol and mixtures thereof. Self-shine emulsions with a pH value in undiluted form of 6 to 8 are particularly preferred.

The new self-shine emulsions are distinguished by high stability in storage, particularly at low temperatures. A particularly noteworthy feature is their extremely uniform drying behavior characterized by the virtual absence of cracks in the film, so that uniform floor-care films of satisfactory appearance are obtained.

Suitable waxes for the self-shine emulsions according to the invention are both natural waxes and synthetic waxes which may be of natural origin or even fully synthetic. Examples are polyethylene waxes, oxidized polyethylene waxes, montan ester waxes, paraffin waxes, candellila wax and carnauba wax. Of these waxes, montan ester wax, paraffin wax, carnauba wax and polyethylene wax are preferred in the formulations according to the invention. Wax mixtures of montan ester wax and polyethylene wax and of montan ester wax and carnauba wax are particularly preferred. The wax content in the formulations according to the invention may be from 2 to 50% and is preferably from 2 and 15% by weight.

Unless predominantly self-emulsifying waxes are used, the emulsions according to the invention contain typical wax emulsifiers in quantities of 0.1 to 10% by weight and preferably in quantities of 0.5 to 3% by weight. Examples of such emulsifiers are oleyl cetyl alcohol ethoxylated with 20 moles of ethylene oxide (EO) and sorbitan monooleate.

The second characteristic component of the self-shine emulsion according to the invention is an aromatic alcohol from the group consisting of benzyl alcohol, 2-phenylethanol and 2-phenoxyethanol. Mixtures of these alcohols may of course also be used. In conjunction with the waxes in the aqueous neutral emulsion, these alcohols appear to be responsible for the unexpected properties of the new formulations mentioned above. Small quantities of these alcohols are generally sufficient. Their percentage content in the formulations according to the invention is from 0.05 to 11% by weight and preferably from 1 to 5% by weight.

In addition to the waxes mentioned above, which make up the predominant part of the solids in the formulations according to the invention, the formulations may contain film-forming polymers in dispersed form. The polymer component is intended to make the floor-care films more resistant to mechanical damage. The polymer compounds present in the self-shine emulsions are those which are at least partly insoluble in water at a neutral pH value and which have a minimum film forming temperature in the range from about 0° to about 70° C. The polymer compounds in question are preferably polymers prepared from ethylenically unsaturated monomers. Examples of such monomers are styrene, acrylates or methacrylates of aliphatic alcohols containing 1 to 8 carbon atoms, acrylonitrile, vinyl acetate, acrylic acid and methacrylic acid. Particularly preferred polymers are poly(meth)acrylates of two or more of these monomers which may even contain other monomers in small quantities. Most particularly preferred polymers contain 1 to 30 parts by weight of monomers containing carboxylic acid groups, 30 to 70 parts by weight of monomers which form homopolymers with glass temperatures below 20° C., preferably esters of acrylic acid with $C_{1-8}$ alcohols and/or methacrylic acid with $C_{4-8}$ alcohols, and 30 to 70 parts by weight of monomers which form homopolymers having glass temperatures above room temperature, preferably methacrylates of $C_{1-3}$ alcohols or styrene. Where several different polymer compounds of the type mentioned above are used in the form of a mixture, the film forming temperature determined for the mixture should be in the range from 0° to 0° C. The film forming temperatures mentioned apply to the plasticizer-free system, i.e. to the polymers with no further additives.

The polymers may be present in the formulations according to the invention in quantities of up to 30% by weight and, more particularly, in quantities of 1 to 20% by weight. These figures apply to the pure polymers. If the suspensions according to the invention are produced from dispersed polymers of the type often available on the market, the dispersions in question have to be used in correspondingly larger quantities in the production of the formulations according to the invention.

In addition to the ingredients mentioned above, the self-shine emulsions according to the invention may contain other active substances and auxiliaries in relatively small quantities, including for example plasticizers, wetting agents and flow control agents, wetting resins, preservatives and perfume oils.

Plasticizers are intended to modify the consistency of the film, a distinction being drawn between temporary plasticizers and permanent plasticizers. Temporary plasticizers are volatile hydrophilic solvents which promote the coalescence of the polymer particles during film formation. Examples are ethylene glycol, diethylene glycol and also glycol and polyglycol ethers. Their percentage content in the formulations according to the invention is generally not more than 15% by weight and is preferably between 0.5 and 10% by weight. Permanent plasticizers are liquids which are not volatile under normal conditions so that the character of the floor-care film can be lastingly influenced with their assistance. Examples of such plasticizers are dibutyl phthalate, tributyl phosphate, tributoxyethyl phosphate and N-methyl caprolactam. Permanent plasticizers also are generally present in the suspensions according to the invention in quantities of not more than 15% by weight and preferably in a quantity of 0.5 to 10% by weight.

Wetting agents and flow control agents are intended to improve the wetting of the treated surface during application of the self-shine emulsion. In addition, they make the emulsion easier to dilute with water, for example for application to wet floors. Suitable wetting and flow control agents are any of the usual surfactants, more particularly nonionic and anionic surfactants, for example ethoxylates of long-chain alcohols or alkyl benzene sulfonates and fatty alcohol sulfates. Fluorine surfactants are also used in many cases and produce a particularly marked reduction in surface tension. The content of wetting and flow control agents is generally not more than 5% by weight, based on the total weight of the self-shine emulsion, and is preferably between 0.1 and 2% by weight. Surface wetting during application can also be improved with wetting resins. Wetting resins are preferably styrene/maleate resins or clear polyacrylates. Their content in the formulations is generally not more than 5% by weight and is preferably from 0.1 to 2% by weight.

The formulations may be prepared by standard suspending processes. For example, they may be prepared by the water-in-wax method or by the wax-in-water method. If necessary, the pH of the formulation is adjusted to the required value in the neutral range (pH 5 to pH 9) by addition of alkalis.

The self-shine emulsions according to the invention are generally applied in undiluted form. The emulsions are applied to the surface and uniformly distributed thereon in the required quantity using a soft object, for example a sponge or a cloth. After evaporation of the water, an extremely uniform, glossy film is left on the surface in this floor-care process.

EXAMPLES

A wax-in-water dispersion was first prepared from the waxes and emulsifiers listed in the Table and was then mixed with the other components to form the final formulations. Unless otherwise indicated, the figures in the Tables are percentages by weight, based on the pure active substances. Self-shine emulsions 1 to 4 thus prepared were then tested for their stability during storage at low temperatures and for their flow control properties.

To evaluate stability at low temperatures, the samples were stored for 12 weeks at 0° to 3° C. Over this period, the samples were removed weekly from the freezer and visually evaluated on reaching room temperature. Visible signs of instability were flocculation, sediment, deposits and changes in viscosity. Evaluation was based on the following scale:

0 uniform, homogeneous sample
1 slight deposits or sediment after 12 weeks
2 slight deposits or sediment after 3 weeks
3 medium deposits or sediment after 3 weeks
4 heavy deposits or sediment after 3 weeks
5 very heavy deposits or sediment after 3 weeks The flow control properties were determined by application to black untreated PVC sheets under conditions which meet practical requirements. To this end, 10 ml of the suspension to be tested were uniformly applied by hand applicator to a 30×60 cm PVC tile in each test. The applicator consisted of an upholstery velvet stretched over a frame with an effective surface area of 20×5.5 cm. After drying, the appearance of the surface was visually evaluated on the following scale:

0 streak-free
1 faintly visible uniform streaks
2 distinctly visible streaks
3 distinct, uneven streaks
4 heavy uneven residues.

TABLE 1

| Example | 1 | 2 | 3 | 4 |
| --- | --- | --- | --- | --- |
| Isothiazoline | 0.02 | — | — | — |
| Montan wax, dropping point 82° C. | 3.5 | 3.5 | 3.5 | 3.5 |
| Ester wax, solidification point 85° C. | 3.5 | 3.5 | 3.5 | 3.5 |
| Oleyl cetyl alcohol + 23 EO | 0.5 | 0.5 | 0.5 | 0.5 |
| Isotridecyl alcohol + 8 EO | 1.0 | 1.0 | 1.0 | 1.0 |
| Styrene acrylate MFT 45° C.* | 4.5 | 4.5 | 4.5 | 4.5 |
| Zonyl FSJ (fluorine surfactant) | 0.02 | 0.02 | 0.02 | 0.02 |
| Diethyl ethanolamine | 0.3 | 0.3 | 0.3 | 0.3 |
| Perfume | 0.2 | 0.2 | 0.2 | 0.2 |
| 2-Phenoxyethanol | — | 2.0 | — | — |
| 2-Phenylethanol | — | — | 1.0 | — |
| Benzyl alcohol | — | — | — | 1.0 |
| Water | ad 100 | ad 100 | ad 100 | ad 100 |
| pH value | 8.4 | 8.4 | 8.4 | 8.4 |
| Stability in storage at <0° C. | 3 | 0 | 0 | 0 |
| Flow control properties | 4 | 0 | 0 | 0 |

*MFT = minimum film forming temperature

The test results clearly reflect the advantageous properties of self-shine emulsions 2–4 according to the invention in relation to comparison formulations 1.

We claim:

1. An aqueous, floor care, self-shine emulsion composition having a pH of 5 to 9, said composition comprising from 2 to 50% by weight of a natural or synthetic wax selected from the group consisting of montan ester wax, paraffin wax, carnauba wax, and mixtures thereof, and from 1% to 5% by weight of an alcohol selected from the group consisting of benzyl alcohol, 2-phenylethanol, 2-phenoxyethanol and mixtures thereof.

2. A composition as in claim 1 having a pH of 6 to 8.

3. A composition as in claim 1 further containing from 1% to 20% by weight of an at least partly water-insoluble polymer having a minimum film forming temperature of 0° C. to 70° C., based on the weight of said composition.

4. The process of providing a shine to a floor comprising applying to said floor an undiluted aqueous self-shine emulsion composition having a pH of 5 to 9, said composition comprising from 2% to 50% by weight of a natural or synthetic wax selected from the group consisting of montan ester wax, paraffin wax, carnauba wax, and mixtures thereof, and from 1% to 5% by weight of an alcohol selected from the group consisting of benzyl alcohol, 2-phenylethanol, 2-phenoxyethanol and mixtures thereof, and allowing said composition to dry.

5. A process as in claim 4 wherein said composition has a pH of 6 to 8.

6. A process as in claim 4 wherein said composition further contains from 1% to 20% by weight of an at least partly water-soluble polymer having a minimum film forming temperature of 0° C. to 70° C., based on the weight of said composition.

* * * * *